US009172760B2

(12) United States Patent
Wang (10) Patent No.: US 9,172,760 B2
(45) Date of Patent: Oct. 27, 2015

(54) METHOD AND DEVICE FOR MONITORING SERVICE USAGE AMOUNT

(71) Applicant: HUAWEI TECHNOLOGIES CO., LTD., Shenzhen (CN)

(72) Inventor: Jun Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 13/690,044

(22) Filed: Nov. 30, 2012

(65) Prior Publication Data

US 2013/0091276 A1    Apr. 11, 2013

Related U.S. Application Data

(63) Continuation of application No. PCT/CN2011/079313, filed on Sep. 5, 2011.

(30) Foreign Application Priority Data

Dec. 31, 2010    (CN) .......................... 2010 1 0624359

(51) Int. Cl.
*H04L 29/04*    (2006.01)
*H04L 29/08*    (2006.01)
(Continued)

(52) U.S. Cl.
CPC ............ *H04L 67/16* (2013.01); *H04L 12/1407* (2013.01); *H04L 12/2602* (2013.01); *H04L 43/00* (2013.01); *H04L 67/22* (2013.01); *H04M 15/10* (2013.01); *H04M 15/58* (2013.01)

(58) Field of Classification Search
CPC .................................. G06F 21/00; G06F 12/14
USPC ........................................................ 709/224
See application file for complete search history.

(56) References Cited

U.S. PATENT DOCUMENTS

2003/0027566 A1    2/2003    Weiner
2007/0036109 A1    2/2007    Kwak et al.
(Continued)

FOREIGN PATENT DOCUMENTS

CN    1889475    1/2007
CN    1925423    3/2007
(Continued)

OTHER PUBLICATIONS

First Office Action, dated Jan. 30, 2013, in corresponding Chinese Application No. 201010624359.8 (12 pp.).
(Continued)

*Primary Examiner* — David Lazaro
*Assistant Examiner* — Zia Khurshid
(74) *Attorney, Agent, or Firm* — Staas & Halsey LLP (57) ABSTRACT

A method and a device for monitoring a service usage amount includes: determining, according to one of quintuple information, protocol information, and URL information in received service request information, whether the service request information is the same as specified service stream information in one or multiple session level service monitoring tasks, where the session level service monitoring task includes a session level service monitoring class identity, a monitoring task identity, and the specified service stream information; the monitoring class identity indicates that the monitoring task is used to monitor a usage amount of a specified service stream in a session; when determining yes, accumulating a usage amount of the service request information in the one or multiple session level service monitoring tasks; and reporting the monitoring task identity and an accumulated usage amount of the service request information in the session level service monitoring task to a PCRF.

13 Claims, 4 Drawing Sheets

(51) Int. Cl.
*H04L 12/26* (2006.01)
*H04L 12/14* (2006.01)
*H04M 15/10* (2006.01)
*H04M 15/00* (2006.01)

(56) References Cited

U.S. PATENT DOCUMENTS

| | | | |
|---|---|---|---|
| 2007/0050846 | A1 | 3/2007 | Xie et al. |
| 2010/0043053 | A1 | 2/2010 | Wei et al. |
| 2012/0117235 | A1* | 5/2012 | Castro Castro et al. ...... 709/224 |
| 2013/0304616 | A1* | 11/2013 | Raleigh et al. .................. 705/34 |

FOREIGN PATENT DOCUMENTS

| | | |
|---|---|---|
| CN | 101232386 A | 7/2008 |
| CN | 101296169 A | 10/2008 |
| CN | 101325780 A | 12/2008 |
| CN | 101465763 | 6/2009 |
| CN | 102142990 | 8/2011 |

OTHER PUBLICATIONS

Extended European Search Report mailed Oct. 21, 2013 in corresponding European Application No. 11853578.0.
3rd Generation Partnership Project; Technical Specification Group Core Network and Terminals; Policy and Charging Control over Gx Reference Point (Release 10), 3GPP TS 29.212 V10.0.0, Sep. 2010, pp. 1- 21.
3rd Generation Partnership Project; Technical Specification Group Services and System Aspects; Policy and Charging Control Architecture (Release 11), 3GPP TS 23.203 V11.0.0, Dec. 2010, pp. 1-137.
International Search Report of PCT/CN2011/079313 mailed Dec. 15, 2011.
Chinese Office Action mailed Apr. 27, 2013 in corresponding Chinese Patent Application No. 201180001626.9.

* cited by examiner

METHOD AND DEVICE FOR MONITORING SERVICE USAGE AMOUNT

CROSS-REFERENCE TO RELATED APPLICATIONS

This application is a continuation of International Application No. PCT/CN2011/079313, filed on 5 Sep. 2011, which claims priority to Chinese Patent Application No. CN201010624359.8, filed on Dec. 31, 2010, both of which are hereby incorporated by reference in their entireties.

FIELD OF THE INVENTION

The present invention relates to communications technologies, and in particular to a method and a device for monitoring a service usage amount.

BACKGROUND OF THE INVENTION

An IP network may provide more types of services, such as multimedia call, file downloading, and web page browsing, and therefore the network needs to be capable of detecting different service streams and measuring and reporting charging information such as traffic volume and duration to the charging center. Organizations such as 3GPP and worldwide interoperability for microwave access (Worldwide Interoperability for Microwave Access, WiMAX for short) forum have defined policy and charging control based on a policy charging control (Policy Charging Control, PCC for short) architecture. The PCC architecture allows a network to detect different service streams and meet requirements such as quality of service (QoS) control and charging measurement for service streams.

The PCC architecture includes functional entities such as a policy charging enforcement function (Policy Charging Enforcement Function, PCEF for short) and a policy charging rules function (Policy Charging Rules Function, PCRF for short). The PCEF supports interception for a single service stream, a group of service streams, or all service streams in a session. The PCRF supports usage amount management based on the rule level and session level, and may dynamically control bandwidth or charging rules by using the usage amount reported by the PCEF. A Gx interface is used between the PCRF and the PCEF for policy delivery and usage amount reporting: The PCEF requests the PCRF for PCC rules through the GX interface, the PCRF provides PCC rules for the PCEF through the GX interface, and the PCEF reports a service usage amount monitored according to the PCC rules to the PCRF through the GX interface.

However, the existing usage amount monitoring mechanism cannot meet the following requirements: For example, the usage amount of a specific website such as www.sina.com needs to be intercepted, and at the same time all HTTP protocol usage amounts of users in a session need to be further intercepted so as to control the quality of service when the access volume of Sina reaches a certain threshold and to control the quality of service of the specific website when the HTTP service reaches a certain threshold. If the rule level monitoring is used, the PCEF only preferably accumulates the service stream of www.sina.com to a certain rule during identification, and the usage amount for the service stream is reported to the rule corresponding to the HTTP protocol or to the rule corresponding to www.sina.com. In this way, the usage amount for another rule is not the complete usage amount. If session level monitoring is used, as session level monitoring is aimed for monitoring all service usage amounts of users in a session, service streams of users in the session accessing any website by using any protocol are accumulated to a rule and reported to the PCRF. As such, the usage amount of users accessing www.sina.com cannot be distinguished from the usage amount by using the HTTP protocol. Therefore, currently the service usage amount reported by the PCEF to the PCRF is not accurate, resulting in failure to accurately control the quality of service for other services subsequently.

SUMMARY OF THE INVENTION

Embodiments of the present invention provide a method and a device for monitoring a service usage amount, which are used to solve the defect of inaccurate service usage amount reported by the PCEF to the PCRF in the prior art, and to meet the purpose of accurately collecting a service usage amount of a user by using the PCRF.

An embodiment of the present invention provides a method for monitoring a service usage amount, including:

determining, according to one of quintuple information, protocol information, and URL information in received service request information, whether the service request information is the same as specified service stream information in one or multiple session level service monitoring tasks; where the session level service monitoring task includes a session level service monitoring class identity, a monitoring task identity, and the specified service stream information; the monitoring class identity indicates that the monitoring task is used to monitor a usage amount of a specified service stream in a session;

when determining that the service request information is the same as the specified service stream information in the one or multiple session level service monitoring tasks, accumulating a usage amount of the service request information in the one or multiple session level service monitoring tasks; and reporting the monitoring task identity and the accumulated usage amount of the service request information in the session level service monitoring task to a Policy Charging Rules Function.

An embodiment of the present invention provides a device for monitoring a service usage amount, including:

a determining module, configured to determine, according to one of quintuple information, protocol information, and URL information in received service request information, whether the service request information is the same as specified service stream information in one or multiple session level service monitoring tasks; where the session level service monitoring task includes a session level service monitoring class identity, a monitoring task identity, and the specified service stream information; the monitoring class identity indicates that the monitoring task is used to monitor a usage amount of a specified service stream in a session;

an accumulating module, configured to: when determining that the service request information is the same as the specified service stream information in the one or multiple session level service monitoring tasks, accumulate a usage amount of the service request information in the one or multiple session level service monitoring tasks; and a reporting module, configured to report the monitoring task identity and the accumulated usage amount of the service request information in the session level service monitoring task to a Policy Charging Rules Function.

According to the method and device for monitoring the service usage amount provided in the embodiments of the present invention, the PCEF monitors multiple specified services in a session of a specific user according to multiple session level service monitoring tasks delivered by the PCRF, compares quintuple information, protocol information, and URL information in the service request information received in the session with the specified service stream corresponding to each session level service monitoring task, determines specified service stream information that is the same as the service request information, and then reports the usage amount corresponding to the service request to the PCRF through the monitoring task identity corresponding to the same specified service stream information, respectively. Therefore, the embodiments of the present invention can accumulate the usage amount of one service stream, respectively, to multiple session level service monitoring tasks corresponding to the same specified service stream information and report it to the PCRF, overcoming the defect where the usage amount reporting is inaccurate because the PCEF cannot accumulate the usage amount of one service stream to multiple monitoring tasks. As such, the PCRF can collect an accurate service usage amount of a user, thereby controlling subsequent quality of service.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
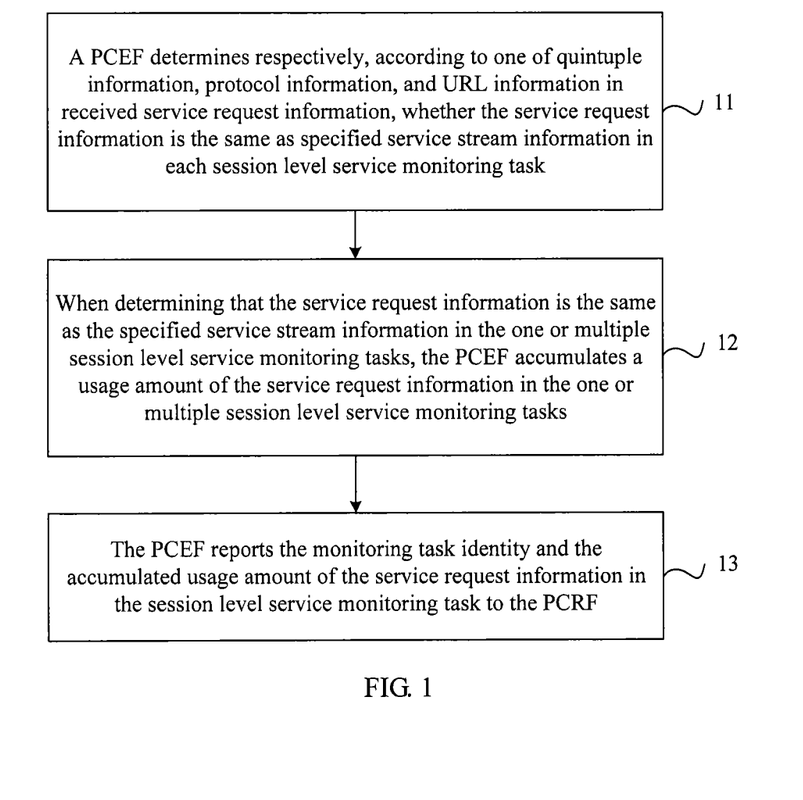
FIG. 1 is a flow chart of a method for monitoring a service usage amount according to a first embodiment of the present invention.

FIG. 1 is a flow chart of a method for monitoring a service usage amount according to a first embodiment of the present invention. As shown in FIG. 1, this embodiment includes:

Step 11: A PCEF determines, according to one of quintuple information, protocol information, and URL information in received service request information, whether the service request information is the same as specified service stream information in each session level service monitoring task.

After the PCEF initiates a Gx+ session establishment request to a PCRF, the PCRF sends multiple session level service monitoring tasks to the PCEF. Each session level service monitoring task includes a session level service monitoring class identity, a monitoring task identity, and specified service stream information. The session level service monitoring class identities corresponding to all session level service monitoring tasks are the same, the monitoring task identities corresponding to all session level service monitoring tasks are different, and the corresponding specified service stream information is also different. The session level service monitoring class identity indicates that the monitoring task is used to monitor a usage amount of a specified service of a user in the current session. Through the monitoring task class identity in a session level service monitoring task, the PCEF may know the usage amount of a specified service of a user in the current session as instructed by the PCRF.

The corresponding specified service stream information in each session level service monitoring task is correlated in terms of protocol, or may not be correlated. For example, for a session level service monitoring task A that monitors the usage amount of a specific user in accessing www.sina.com in a session and a session level service monitoring task B that monitors all usage amounts of the specific user in using the HTTP protocol in the session, as the user may use the HTTP protocol to access www.sina.com, the service usage amount in accessing www.sina.com should also be accumulated to the session level service monitoring task B.

When receiving service request information in the current session, for example, receiving an HTTP browsing request, an RTSP service request, a short message service request, or a multimedia message service request, the PCEF recognizes characteristics such as Port quintuple information, uniform resource locator (Uniform Resource Locator, URL for short) information, and protocol information in the service request information. Furthermore, it compares one of quintuple information, protocol information, and URL information in the service request information against one of quintuple information, protocol information, and URL information corresponding to the specified service stream information; if at least one of the quintuple information, the protocol information, and the URL information is the same, it is determined that the service request information is the same as the specified service stream information. The port quintuple information recognized from the service request information includes: a source IP address and a source port for sending the service request information, a destination IP address and a destination port for receiving the service request information, and a protocol number corresponding to the protocol used for handling the service request information.

Step 12: When determining that the service request information is the same as the specified service stream information in the one or multiple session level service monitoring tasks, the PCEF accumulates a usage amount of the service request information in the one or multiple session level service monitoring tasks.

Step 13: The PCEF reports the monitoring task identity and the accumulated usage amount of the service request information in the session level service monitoring task to the PCRF.

When the specified service stream information corresponding to a certain session level service monitoring task matches the service request information, the accumulated usage amount of the service request information is reported to the PCRF through the monitoring task identity corresponding to the monitoring task, that is, the monitoring task identity corresponding to the specified service stream information. The following case may exist: The specified service stream information corresponding to multiple session level service monitoring tasks is the same as the service request information. The usage amount (including the access duration, access traffic volume, and access times) of the service stream information is accumulated respectively to the session level service monitoring task corresponding to the same specified service stream information, and the usage amount of the service request is reported to the PCEF respectively through different monitoring task identities. The PCEF reports the usage amount of services in one session, and the PCRF performs accumulation management for the service usage amount reported by the PCEF.

According to the method for monitoring the service usage amount provided in this embodiment of the present invention, the PCEF monitors multiple specified services in a session of a specific user according to multiple session level service monitoring tasks delivered by the PCRF, compares quintuple information, protocol information, and URL information in the service request information received in the session with the specified service stream corresponding to each session level service monitoring task, determines specified service stream information that is the same as the service request information, and then reports the usage amount corresponding to the service request to the PCRF through the monitoring task identity corresponding to the same specified service stream information, respectively. Therefore, the embodiments of the present invention can accumulate the usage amount of one service stream, respectively, to multiple session level service monitoring tasks corresponding to the same specified service stream information and report it to the PCRF, overcoming the defect where the usage amount reporting is inaccurate because the PCEF cannot accumulate the usage amount of one service stream to multiple monitoring tasks. As such, the PCRF can collect an accurate service usage amount of a user, thereby controlling subsequent quality of service.

Figure 2:
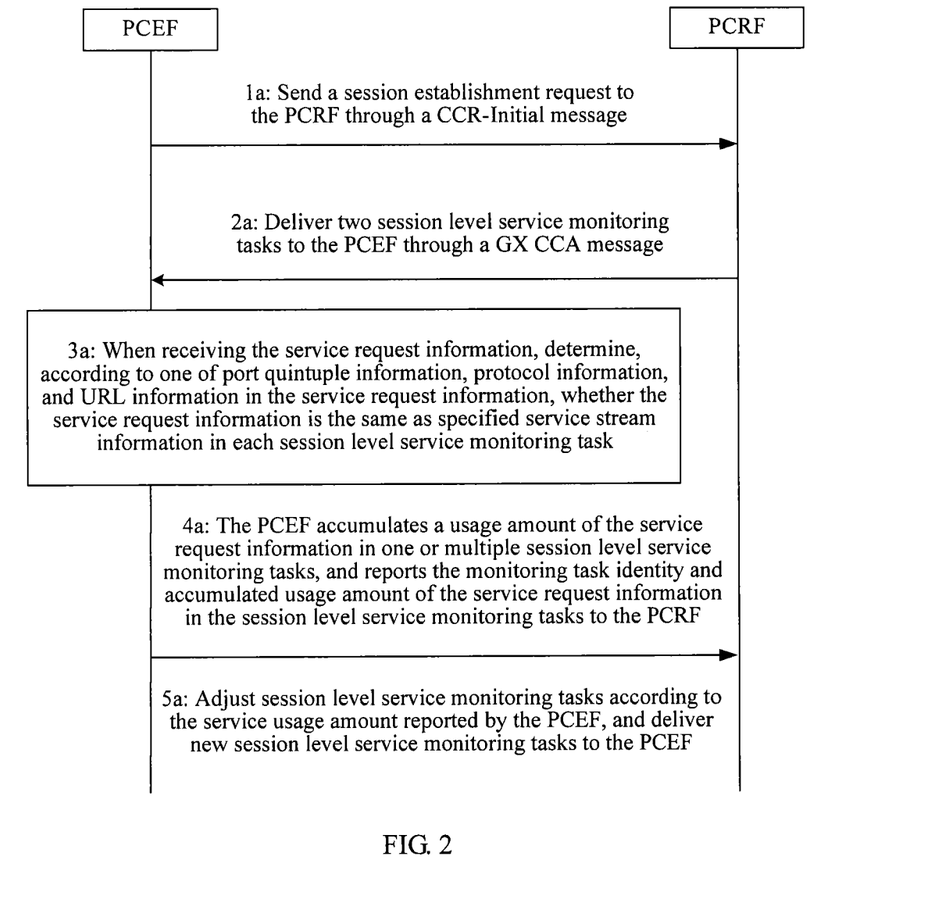
FIG. 2 is a flow chart of a method for monitoring a service usage amount according to a second embodiment of the present invention.

FIG. 2 is a flow chart of a method for monitoring a service usage amount according to a second embodiment of the present invention. In this embodiment, the PCRF delivers a session level service monitoring task to the PCEF through a Gx+ interface.

This embodiment extends the definition of the Usage-Monitoring-Level AVP by adding a monitoring class: SESSION_RULE_LEVEL(2). The monitoring class identity indicates that the delivered monitoring task monitors the usage amount of a specified service in a session. In addition, the [Session-Usage-Monitoring-Flows] AVP is further newly added to instruct the specified service stream information that needs to be monitored, as follows:

```
<CC-Answer> ::=
    [Session-Usage-Monitoring-Flows]
        [ Monitoring-Key] //monitoring task identity
        [ Flow-Information ] //specified service stream information
```

In [Flow-Information], it may also be [URL], which means to monitor a service stream for accessing a specific URL.

As shown in FIG. 2, this embodiment includes:

Step 1a: A PCEF sends a session establishment request to a PCRF through a CCR-Initial message.

The PCEF sends a session establishment request based on one user, that is, one source IP address, to the PCRF through a CCR (Credit Control Request)-Initial message to request the PCRF for delivering a monitoring task corresponding to the user or the IP address. As such, after the user goes online, the PCEF monitors the specific service usage amount of the user according to the monitoring task delivered by the PCRF.

Step 2a: The PCRF delivers two session level service monitoring tasks to the PCEF through a GX CCA (Credit Control Answer) message.

Each session level service monitoring task includes a monitoring class identity, a monitoring task identity, and specified service stream information. For example, for reporting when the monitored traffic volume of a user accessing the google website reaches a specified amount, and reporting when the monitored traffic volume of the user in using the HTTP protocol reaches a specified amount, the PCRF delivers the following two session level service monitoring tasks (the content in the brackets is the actual sent values) to the PCEF:

```
CCA::=
    Usage-Monitoring-Information //monitoring task A
        SESSION_RULE_LEVEL(2)
        Monitor-key(m1)
    Usage-Monitoring-Information //monitoring task B
        SESSION_RULE_LEVEL(2)
        Monitor-key(m2)
    [Session-Usage-Monitoring-Flows]
        Monitor-key(m1)
        Granted-Service-Unit (3MB)
        URL(www.google.com.hk)
    [Session-Usage-Monitoring-Flows]
        Monitor-key(m2)
        Granted-Service-Unit (3MB)
        Flow-Description(protocol:http)
```

In the message content, SESSION_RULE_LEVEL(2) indicates that a class identity of a monitoring task is class 2, Monitor-key(m1) indicates that a task identity of monitoring task A is m1, and Monitor-key(m2) indicates that a task identity of monitoring task B is m2; Granted-Service-Unit (3 MB) indicates that monitoring task A instructs that the usage amount that should be reached for reporting the specified service stream is 3 MB; Flow-Description(protocol:http) indicates that the specified service stream of monitoring task B is the service stream of using the HTTP protocol; URL (www.google.com.hk) indicates that the specified service stream of monitoring task A is the service stream of accessing www.google.com.hk.

Step 3a: When receiving the service request information, the PCEF determines, according to one of port quintuple information, protocol information, and URL information in the received service request information, whether the service request information is the same as specified service stream information in each session level service monitoring task.

Following the two session level service monitoring tasks, the PCEF may first recognize characteristics such as port quintuple information, URL information, and protocol information in the service request information through a deep packet inspection technology. The characteristics such as quintuple information and URL information in the service request information are compared against characteristics of the URL(www.google.com.hk) service stream instructed by [Session-Usage-Monitoring-Flows] in monitoring task A. If one of all the information items of both the service request information and the monitoring task A is the same, it indicates that the service request information is the specified service stream information in monitoring task A and is reported to the PCRF through Monitor-key(m1) when the specified usage amount 3 MB is reached. In addition, the PCEF may further match the characteristics such as quintuple information and URL information in the service request information against characteristics of the Flow-Description(protocol:http) service stream instructed by [Session-Usage-Monitoring-Flows] in monitoring task B. If one of all the information items of both the service request information and the monitoring task B is the same, it indicates that the service request information is the specified service stream information in monitoring task B and is reported to the PCRF through Monitor-key(m2) when the specified usage amount 3 MB is reached.

Step 4a: When determining that the service request information is the same as the specified service stream information in one or multiple session level service monitoring tasks, the PCEF accumulates a usage amount of the service request information in one or multiple session level service monitoring tasks, and reports the monitoring task identity and accumulated usage amount of the service request information in the session level service monitoring tasks to the PCRF.

Assume that a user uses 3 MB traffic when accessing www.google.com.hk. The PCEF recognizes that the service stream further belongs to the service stream of using the HTTP protocol. Then, the PCEF reports the usage amount through the following manner:

```
CCRU::=
    Usage-Monitoring-Information
        Monitor-key(m1)
        Used-Service-Unit
            CC-Total-Octets(3mb)
    Usage-Monitoring-Information
        Monitor-key(m2)
        Used-Service-Unit
            CC-Total-Octets(3MB)
```

In the above CCRU: messages, the PCEF reports the service usage amount 3 MB of accessing www.google.com.hk to the PCRF through monitoring task identity m1, and the PCEF reports the corresponding usage amount 3 MB of accessing the HTTP service stream information to the PCRF through monitoring task identity m2. The content in the brackets in the above CCRU: messages indicate data values actually sent by the PCEF to the PCRF.

Step 5a: The PCRF adjusts session level service monitoring tasks according to the service usage amount reported by the PCEF, and delivers new session level service monitoring tasks to the PCEF.

The PCEF reports the traffic volume used by the user in accessing www.google.com.hk in a session and the traffic volume of the user in using the HTTP protocol in a session. The PCRF performs accumulation management for the usage amount reported by the PCEF so as to control the quality of service of the google website when the access volume of google reaches a certain threshold and to control the quality of service of a specific website when the HTTP service reaches a certain threshold.

Figure 3:
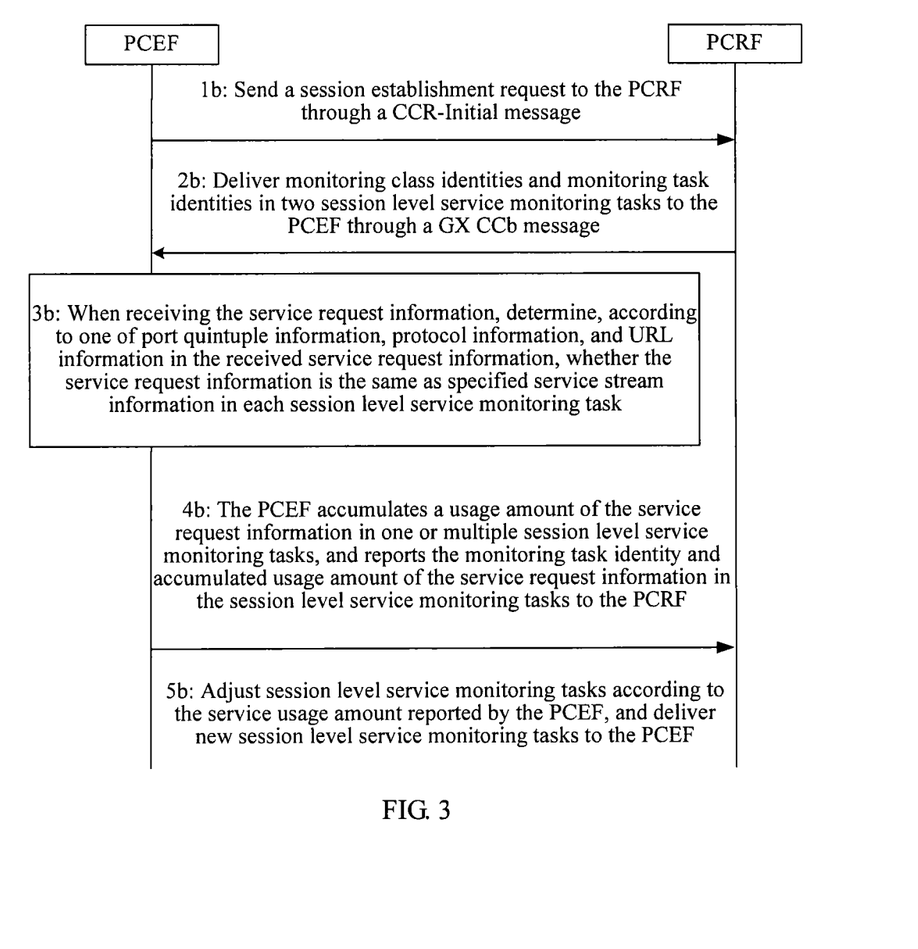
FIG. 3 is a flow chart of a method for monitoring a service usage amount according to a third embodiment of the present invention.

FIG. 3 is a flow chart of a method for monitoring a service usage amount according to a third embodiment of the present invention. The difference between this embodiment and the preceding embodiment is as follows: The PCRF delivers the monitoring class identity and monitoring task identity in a session level service monitoring task to the PCEF only through the Gx+ interface, and delivers specified service stream information in the session level service monitoring task to the PCEF through a newly added service stream synchronization interface. The service stream synchronization interface needs to transfer Monitor-key and flow-info. in the CCA message, where flow-info includes port quintuple information and URL information.

As shown in FIG. 3, this embodiment includes:

Step 1b: The PCEF sends a session establishment request to the PCRF through a CCR-Initial message.

Step 2b: The PCRF delivers monitoring class identities and monitoring task identities in two session level service monitoring tasks to the PCEF through a GX CCA message.

For example, to monitor the traffic volume of a user in accessing the google website and using the HTTP protocol, the PCRF puts both of the monitoring task identities and specified service stream information, in the session level service monitoring tasks, into SOAP messages and sends the messages to the PCEF through the service stream synchronization interface. For example, the following information is sent: Flow-ID: m1; URL: www.google.com.hk; Flow-ID: m2; Protocol: http; Granted-Service-Unit: 3 MB.

When receiving the CCR-Initial message from the PCEF, the PCRF delivers the monitoring task identities and monitoring task identities in two session level service monitoring tasks to the PCEF:

```
CCA::=
    Usage-Monitoring-Information
        SESSION_RULE_LEVEL(2)
        Monitor-key(m1)
    Usage-Monitoring-Information
        SESSION_RULE_LEVEL(2)
        Monitor-key(m2)
```

In the CCA message, only related information in Usage-Monitoring-Information is delivered, but information in [Session-Usage-Monitoring-Flows] is not delivered. Through Monitor-key received from the service stream synchronization interface and Monitor-key in Usage-Monitoring-Information, specified service stream information received from the service stream synchronization interface may be correlated with SESSION_RULE_LEVEL(2) in Usage-Monitoring-Information to acquire complete information of a monitoring task.

Step 3b: When receiving the service request information, the PCEF determines, according to one of port quintuple information, protocol information, and URL information in the received service request information, whether the service request information is the same as specified service stream information in each session level service monitoring task.

Step 4b: When determining that the service request information is the same as the specified service stream information in one or multiple session level service monitoring tasks, the PCEF accumulates a usage amount of the service request information in one or multiple session level service monitoring tasks, and reports the monitoring task identity and accumulated usage amount of the service request information in the session level service monitoring tasks to the PCRF.

Assume that a user uses 3 MB traffic when accessing www.google.com.hk. The PCEF recognizes that the service stream further belongs to the service stream of using the HTTP protocol. Then, the PCEF reports the usage amount through the following manner:

```
CCRU::=
    Usage-Monitoring-Information
        Monitor-key(m1)
        Used-Service-Unit
            CC-Total-Octets(3mb)
    Usage-Monitoring-Information
        Monitor-key(m2)
        Used-Service-Unit
            CC-Total-Octets(3mb)
```

The content in the brackets in the CCRU: information indicates data values actually sent by the PCEF to the PCRF.

Step 5b: The PCRF adjusts session level service monitoring tasks according to the service usage amount reported by the PCEF, and delivers new session level service monitoring tasks to the PCEF.

The PCEF knows that the currently delivered multiple monitoring tasks are session level service monitoring tasks for monitoring information of multiple specified service streams of a user in a session and knows the identities of the monitoring tasks through the monitoring task identities in all session level monitoring tasks delivered by the PCRF from the Gx+ interface. The PCEF acquires the specified service stream information in all session level service monitoring tasks and the corresponding monitoring task identities delivered by the PCRF through the service stream synchronization interface.

Figure 4:
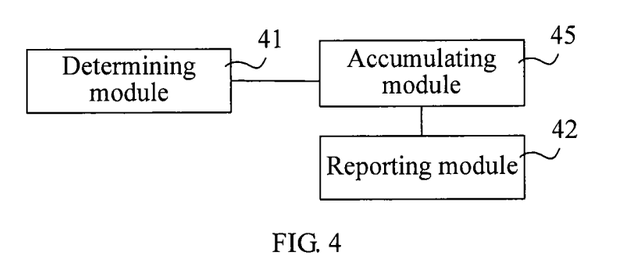
FIG. 4 is a schematic structural diagram of a device for monitoring a service usage amount according to a first embodiment of the present invention.

FIG. 4 is a schematic structural diagram of a device for monitoring a service usage amount according to a first embodiment of the present invention. As shown in FIG. 4, this embodiment includes: a determining module 41, an accumulating module 45, and a reporting module 42.

The determining module 41 is configured to determine, according to one of quintuple information, protocol information, and URL information in received service request information, whether the service request information is the same as specified service stream information in one or multiple session level service monitoring tasks, where the session level service monitoring task includes a session level service monitoring class identity, a monitoring task identity, and the specified service stream information; the class identity indicates that the monitoring task is used to monitor a usage amount of a specified service in a session.

Furthermore, the determining module 41 may be specifically configured to determine whether one of quintuple information, protocol information, and URL information in the service request information is respectively the same as one of quintuple information, protocol information, and URL information corresponding to the specified service stream information; and if at least one of the quintuple information, the protocol information, and the URL information is the same, determine that the service request information is the same as the specified service stream information.

The accumulating module 45 is configured to: when determining that the service request information is the same as the specified service stream information in the one or multiple session level service monitoring tasks, accumulate a usage amount of the service request information in the one or multiple session level service monitoring tasks.

The reporting module 42 is configured to report the monitoring task identity and an accumulated usage amount of the service request information in the session level service monitoring task to a Policy Charging Rules Function PCRF.

Figure 5:
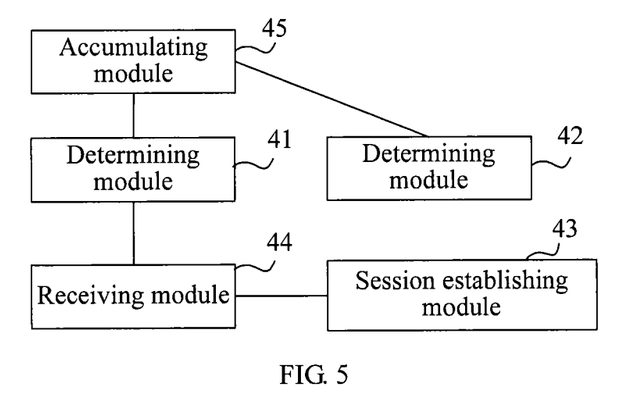
FIG. 5 is a schematic structural diagram of a device for monitoring a service usage amount according to a second embodiment of the present invention.

Furthermore, on the basis of FIG. 4, this embodiment further includes: a session establishing module 43 and a receiving module 44.

The session establishing module 43 is configured to send a session establishment request to the PCRF.

The receiving module 44 is configured to receive each session level service monitoring task from the PCRF.

The receiving module 44 is specifically configured to receive each session level service monitoring task sent by the PCRF through a Gx+ interface. Or the receiving module 44 is specifically configured to receive the monitoring task class identity and task identity of each session level service monitoring task sent by the PCRF through the Gx+ interface, and receive the specified service stream information and monitoring task identity of each session level service monitoring task sent by the PCRF through a service stream information synchronization interface.

For the working mechanism of each module, reference may be made to the descriptions in the embodiments corresponding to FIG. 1 to FIG. 3. The working mechanisms are not described herein.

According to this embodiment, the PCEF monitors multiple specified services in a session of a specific user according to multiple session level service monitoring tasks delivered by the PCRF, compares quintuple information, protocol information, and URL information in the service request information received in the session with the specified service stream corresponding to each session level service monitoring task, determines specified service stream information that is the same as the service request information, and then reports the usage amount corresponding to the service request to the PCRF through the monitoring task identity corresponding to the same specified service stream information, respectively. Therefore, the embodiments of the present invention can accumulate the usage amount of one service stream, respectively, to multiple session level service monitoring tasks corresponding to the same specified service stream information and report it to the PCRF, overcoming the defect where the usage amount reporting is inaccurate because the PCEF cannot accumulate the usage amount of one service stream to multiple monitoring tasks. As such, the PCRF can collect an accurate service usage amount of a user, thereby controlling subsequent quality of service.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as ROM, RAM, magnetic disk, or optical disk, and the like.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments, or make equivalent substitutions to some technical features thereof, without departing from the spirit and scope of the technical solutions of the embodiments of the present invention.

What is claimed is:

1. A method for monitoring a service usage amount, comprising:
    determining, according to one of quintuple information, protocol information, and URL information in received service request information, whether the service request information is the same as specified service stream information in multiple session level service monitoring tasks; wherein the session level service monitoring task comprises a session level service monitoring class identity, a monitoring task identity, and the specified service stream information; the monitoring class identity indicates that the monitoring task is used to monitor a usage amount of a specified service stream in a session;

when determining that the service request information is the same as the specified service stream information in the multiple session level service monitoring tasks, accumulating a usage amount of the service request information in the multiple session level service monitoring tasks respectively; and reporting the monitoring task identity and the accumulated usage amount of the service request information in the multiple session level service monitoring tasks to a Policy Charging Rules Function.

2. The method for monitoring the service usage amount according to claim 1, wherein the determining, according to one of quintuple information, protocol information, and URL information in received service request information, whether the service request information is the same as specified service stream information in multiple session level service monitoring tasks comprises:

determining whether one of the quintuple information, the protocol information, and the URL information in the service request information is respectively the same as one of quintuple information, protocol information, and URL information corresponding to the specified service stream information; and if at least one of the quintuple information, the protocol information, and the URL information is the same, determining that the service request information is the same as the specified service stream information.

3. The method for monitoring the service usage amount according to claim 1, before determining whether the service request information is the same as specified service stream information in each session level service monitoring task, further comprising:

sending a session establishment request to the Policy Charging Rules Function; and receiving each of the session level service monitoring tasks sent by the Policy Charging Rules Function.

4. The method for monitoring the service usage amount according to claim 3, wherein the receiving each of the session level service monitoring tasks in the session sent by the Policy Charging Rules Function is specifically:

receiving each of the session level service monitoring tasks sent by the Policy Charging Rules Function through a Gx+ interface.

5. The method for monitoring the service usage amount according to claim 3, further comprising: the receiving each of the session level service monitoring tasks in the session sent by the PCRF is specifically:

receiving monitoring task class identities and monitoring task identities of the session level service monitoring tasks sent by the Policy Charging Rules Function through a Gx+ interface, and receiving specified service stream information and monitoring task identities of each session level service monitoring task sent by the Policy Charging Rules Function through a service stream information synchronization interface.

6. A device for monitoring a service usage amount, comprising a processor and a non-transitory computer readable medium, wherein the non-transitory computer readable medium further comprises:

a determining module, configured to determine, according to one of quintuple information, protocol information, and URL information in received service request information, whether the service request information is the same as specified service stream information in multiple session level service monitoring tasks; wherein the session level service monitoring task comprises a session level service monitoring class identity, a monitoring task identity, and the specified service stream information; the monitoring class identity indicates that the monitoring task is used to monitor a usage amount of a specified service stream in a session;

an accumulating module, configured to: when determining that the service request information is the same as the specified service stream information in the multiple session level service monitoring tasks, accumulate a usage amount of the service request information in the multiple session level service monitoring tasks respectively; and a reporting module, configured to report the monitoring task identity and the accumulated usage amount of the service request information in the multiple session level service monitoring tasks to a Policy Charging Rules Function.

7. The device for monitoring the service usage amount according to claim 6, wherein the determining module is specifically configured to determine whether one of the quintuple information, the protocol information, and the URL information in the service request information is respectively the same as one of quintuple information, protocol information, and URL information corresponding to the specified service stream information; and if at least one of the quintuple information, the protocol information, and the URL information is the same, determine that the service request information is the same as the specified service stream information.

8. The device for monitoring the service usage amount according to claim 6, further comprising:

a session establishing module, configured to send a session establishment request to the Policy Charging Rules Function; and a receiving module, configured to receive each of the session level service monitoring tasks sent by the Policy Charging Rules Function.

9. The device for monitoring the service usage amount according to claim 8, wherein the receiving module is specifically configured to receive each of the session level service monitoring tasks sent by the Policy Charging Rules Function through a Gx+ interface.

10. The device for monitoring the service usage amount according to claim 8, wherein the receiving module is specifically configured to receive the monitoring task class identities and monitoring task identities of each session level service monitoring task sent by the Policy Charging Rules Function through a Gx+ interface, and receive the specified service stream information and monitoring task identities of each session level service monitoring task sent by the Policy Charging Rules Function through a service stream information synchronization interface.

11. A non-transitory computer readable storage medium, storing program, when the program runs, the following methods are performed:

determining, according to one of quintuple information, protocol information, and URL information in received service request information, whether the service request information is the same as specified service stream information in multiple session level service monitoring tasks; wherein the session level service monitoring task comprises a session level service monitoring class identity, a monitoring task identity, and the specified service stream information; the monitoring class identity indicates that the monitoring task is used to monitor a usage amount of a specified service stream in a session;

when determining that the service request information is the same as the specified service stream information in the multiple session level service monitoring tasks, accumulating a usage amount of the service request information in the multiple session level service monitoring tasks respectively; and reporting the monitoring task identity and the accumulated usage amount of the service request information in multiple the session level service monitoring tasks to a Policy Charging Rules Function.

12. The non-transitory computer readable storage medium according to claim 11, wherein the determining, according to one of quintuple information, protocol information, and URL information in received service request information, whether the service request information is the same as specified service stream information in multiple session level service monitoring tasks comprises:

determining whether one of the quintuple information, the protocol information, and the URL information in the service request information is respectively the same as one of quintuple information, protocol information, and URL information corresponding to the specified service stream information; and if at least one of the quintuple information, the protocol information, and the URL information is the same, determining that the service request information is the same as the specified service stream information.

13. The non-transitory computer readable storage medium according to claim 11, wherein before determining whether the service request information is the same as specified service stream information in each session level service monitoring task, further comprising:

sending a session establishment request to the Policy Charging Rules Function; and receiving each of the session level service monitoring tasks sent by the Policy Charging Rules Function.

\* \* \* \* \*